United States Patent [19]
Haneda et al.

[11] Patent Number: 6,148,403
[45] Date of Patent: Nov. 14, 2000

[54] DATA RECEIVING WITH SECURITY FEATURE

[75] Inventors: Isamu Haneda, Soraku-gun; Toshio Isoe, Tenri, both of Japan

[73] Assignee: Sharp Kabushiki Kaisha, Osaka, Japan

[21] Appl. No.: 09/062,740

[22] Filed: Apr. 20, 1998

[30] Foreign Application Priority Data

Apr. 22, 1997 [JP] Japan ................................... 9-104145
Dec. 24, 1997 [JP] Japan ................................... 9-354716

[51] Int. Cl.$^7$ ............................. H04L 9/00; H04L 9/32
[52] U.S. Cl. ............................. 713/200; 713/201
[58] Field of Search ............................. 713/200, 202; 455/410

[56] References Cited

U.S. PATENT DOCUMENTS

| | | | |
|---|---|---|---|
| 4,815,032 | 3/1989 | Fujii ................................... | 713/193 |
| 4,912,308 | 3/1990 | Takhira ................................... | 235/379 |
| 4,926,388 | 5/1990 | Kunita et al. ................................... | 365/244 |
| 5,058,036 | 10/1991 | Nakasuji et al. ................................... | 713/193 |
| 5,261,102 | 11/1993 | Hoffman ................................... | 713/183 |
| 5,675,324 | 10/1997 | Hashimoto et al. ................................... | 235/383 |
| 5,689,718 | 11/1997 | Sakurai et al. ................................... | 707/517 |
| 5,719,618 | 2/1998 | Park ................................... | 380/240 |
| 5,798,708 | 8/1998 | Katayama ................................... | 380/271 |
| 5,850,519 | 12/1998 | Vazana ................................... | 709/206 |
| 5,928,364 | 7/1999 | Yamamoto ................................... | 713/202 |
| 5,987,609 | 11/1999 | Hasebe ................................... | 713/200 |

FOREIGN PATENT DOCUMENTS 62-25364 2/1987 Japan .
63-293664 11/1988 Japan .

*Primary Examiner*—Ly V. Hua
*Attorney, Agent, or Firm*—Nixon & Vanderhye P.C.

[57] ABSTRACT

A data receiving apparatus in which mail from a sender for which a secret setting is made cannot be directly confirmed. In this data receiving apparatus, when a password is not inputted or when an incorrect password is inputted by a user when a display is in a state of password input screen, the display indicates only a received mail list for mails from persons who are identified by personal data sets stored in advance which do not have a secret flag. The display also indicates the number of all the mail data sets, including the mail data sets from persons for which the secret flag is set.

8 Claims, 10 Drawing Sheets

FIG. 1

```
   3    2    1
┌─────────────────────────────────────┐
│ ┌───┐                ┌───┐ ┌────┐ ┌──┐ │
│ │TEL│ TEL DIRECTORY  │REG│ │QUIT│ │⌐○│ │
│ └───┘                └───┘ └────┘ └──┘ │
│ ┌──────────┬──────────────────────┐ │
│ │ NAME     │                      │ │
│ ├──────────┼──────────────────────┤ │
│ │ TEL NO.  │                      │ │
│ ├──────────┼──────────────────────┤ │
│ │ FAX NO.  │                      │ │
│ ├──────────┼──────────────────────┤ │
│ │MAIL ADDRESS                     │ │
│ ├──────────┼──────────────────────┤ │
│ │RESIDENCE │                      │ │
│ └──────────┴──────────────────────┘ │
└─────────────────────────────────────┘
```

FIG. 2

| TEL NO. (4) | NAME (5) | ⚷ (6) |
|---|---|---|
| 07477-1-0987 | Inoue Masao | 0 |
| 09884-3-2788 | Saito Mari | 1 |
| 073-588-1234 | Suzuki Takashi | 0 |
| 043-111-0489 | Takahashi Hanako | 0 |
| 0123-52-7734 | Tanaka Ichiro | 1 |
| 05333-5-0266 | Togawa Makoto | 1 |
| 07477-7-1325 | Nakamura Taro | 0 |
| 065-731-0987 | Nomura Kenji | 0 |
| 06577-4-2348 | Fukuoka Ichiko | 1 |
| 07479-2-5687 | Yamada Souichiro | 1 |
| 073-321-0621 | Yamamoto Yusuke | 0 |
| 0222-91-8435 | Watanabe Koji | 0 |

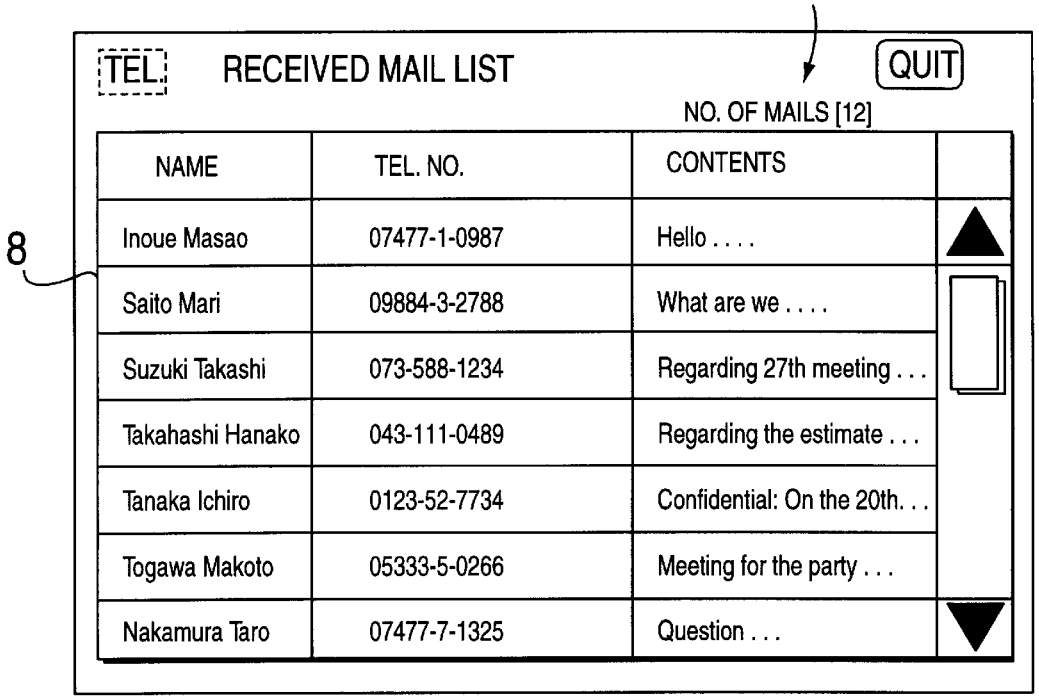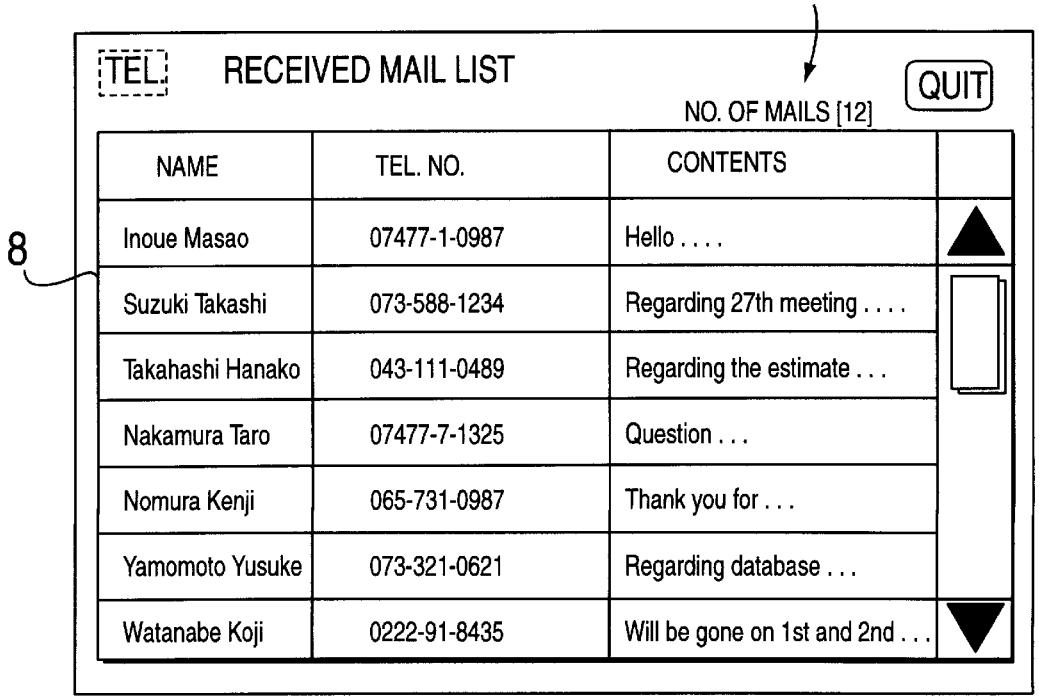

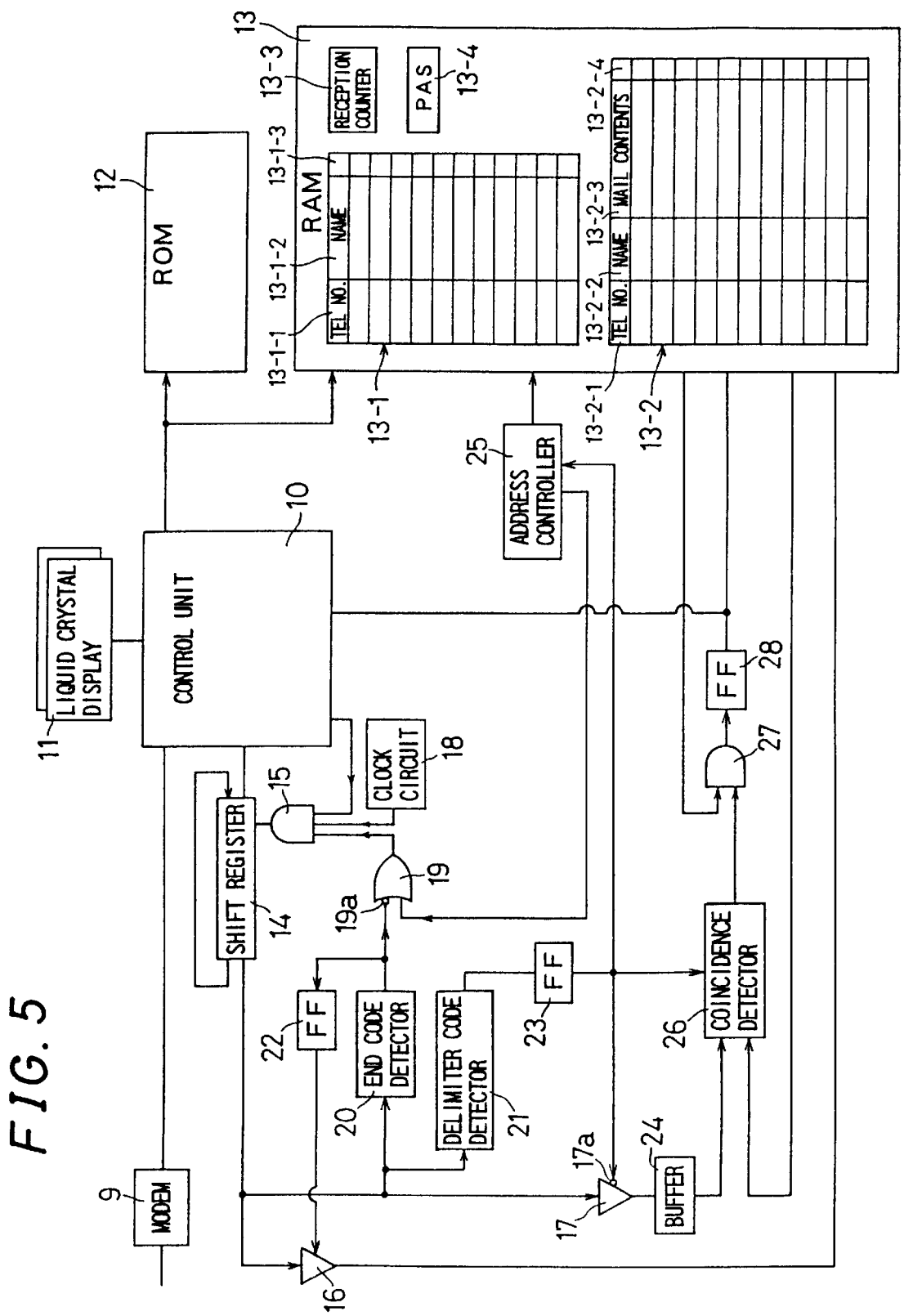

FIG. 9

```
         3      2     32
┌─────────────────────────────┐
│ [TEL] TEL DIRECTORY [REG][QUIT][⌐○] │
│ ┌──────────┬──────────────┐ │
│ │ NAME     │              │ │
│ ├──────────┼──────────────┤ │
│ │ TEL NO.  │              │ │
│ ├──────────┼──────────────┤ │
│ │ FAX NO.  │              │ │
│ ├──────────┼──────────────┤ │
│ │ MAIL ADDRESS │          │ │
│ ├──────────┼──────────────┤ │
│ │ RESIDENCE│              │ │
│ └──────────┴──────────────┘ │
└─────────────────────────────┘
```

FIG. 10

| TEL NO. | NAME | 🔑 |
|---|---|---|
| 07477-1-0987 | Inoue Masao | 0 |
| 09884-3-2788 | Saito Mari | 1 |
| 073-588-1234 | Suzuki Takashi | 0 |
| 043-111-0489 | Takahashi Hanako | 0 |
| 0123-52-7734 | Tanaka Ichiro | 1 |
| 05333-5-0266 | Togawa Makoto | 1 |
| 07477-7-1325 | Nakamura Taro | 0 |
| 065-731-0987 | Nomura Kenji | 0 |
| 06577-4-2348 | Fukuoka Ichiko | 1 |
| 07479-2-5687 | Yamada Souichiro | 1 |
| 073-321-0621 | Yamamoto Yusuke | 0 |
| 0222-91-8435 | Watanabe Koji | 0 |

(columns labeled 4, 5, 33)

FIG. 11

RECEIVED MAIL LIST — 7

TEL | | | QUIT

NO. OF MAILS [12]

| NAME | TEL. NO. | CONTENTS | |
|---|---|---|---|
| Inoue Masao | 07477-1-0987 | Hello .... | ▲ |
| Saito Mari | 09884-3-2788 | What are we .... | |
| Suzuki Takashi | 073-588-1234 | Regarding 27th meeting ... | |
| Takahashi Hanako | 043-111-0489 | Regarding the estimate ... | |
| Tanaka Ichiro | 0123-52-7734 | Confidential: On the 20th... | |
| Togawa Makoto | 05333-5-0266 | Meeting for the party ... | |
| Nakamura Taro | 07477-7-1325 | Question ... | ▼ |

RECEIVED MAIL LIST — 7

TEL | | | QUIT

NO. OF MAILS [12]

| NAME | TEL. NO. | CONTENTS | |
|---|---|---|---|
| Inoue Masao | 07477-1-0987 | Hello .... | ▲ |
| A!<%U$H%1 | JAO$KE$%E"&& | R$k%=%U%H$ND4::$UI | |
| Suzuki Takashi | 073-588-1234 | Regarding 27th meeting ... | |
| Takahashi Hanako | 043-111-0489 | Regarding the estimate ... | |
| $B$3$N4V! | $$$?;~!"!VO" | $BFCBn4X75v$G!"F1< | |
| %~%$%/%m1 | %=%U%H$NOC$r | N%S!<%W2;$K4X$9$!P | |
| Nakamura Taro | 07477-7-1325 | Question ... | ▼ |

8

DATA RECEIVING WITH SECURITY FEATURE

BACKGROUND OF THE INVENTION

1. Field of the Invention

The present invention relates to a data receiving apparatus comprising receiving means for receiving a mail data set, storing means for storing the mail data set received by the receiving means, and display means for displaying the mail data set stored in the storing means.

2. Description of the Related Art

In the prior art, a mail system is composed of a server and a terminal, and a mail as sent from the terminal of a sender is once latched in the server so as to be sent to a terminal of a receiver in response to a demand from the receiver terminal. In a mail system using a portable telephone, when a mail from the sender terminal is received by the server, the server notifies the portable telephone of the mail reception. In response to this notificaion, the portable telephone receives the mail over the public switched phone network for portable telephone.

When the terminal of the mail system as described above are to be used by a plurality of persons, even the mail which is addressed to one of the plurality of persons and desired to be secret from the remainder of the plurality of persons, may be read by the remainder. Therefore, the persons assign their individual passwords to prevent the mail from being accessed by others. When terminals are managed by individuals, on the other hand, passwords may be established for all the mails. In this case, however, even when a mail having no problem with access by others is password-protected, the password has to be inputted for each confirmation.

In order not to password-protect the mail having no problem with access by others in the conventional terminal managed by individuals, the instant invention provides a method for keeping a plurality of stored data sets secret one by one, as disclosed in Japanese Unexamined Patent Publications Nos. 62-25364 and 63-293664. In an electronic apparatus of Japanese Unexamined Patent Publication No. 62-25364, more specifically, of a plurality of data sets to be stored in the electronic apparatus, only data sets to be kept secret are provided with identification codes concerning the secret. In the electronic apparatus of Japanese Unexamined Patent Publication No. 63-293664, a plurality of data sets to be stored in the electronic apparatus are provided with flags for discriminating whether or not the data sets are to be kept secret. It is determined by the operator, when the data sets are to be stored in the electronic apparatus, whether or not the identification codes are added to the data sets, and whether or not the data sets are to be kept secret.

When the technique to be employed in the electronic apparatus described above is applied to the terminal of the mail system, the received mails have to be made secret one by one after received, requiring complicated operations, if they come from a person whose mails should not be accessed by others. Moveover, before the operator specifies the received mail as the secret data, any person can confirm the content of the mail so that there is a problem that the mail may be accessed by others.

SUMMARY OF THE INVENTION

The invention has an object to provide a data receiving apparatus in which mail data set from each of a plurality of senders stored in advance is automatically set to be secret and disables a third person from directly confirming the mail data sets from the senders whose mail data set is set as secret data in advance.

Another object of the invention is to provide a data receiving apparatus which designates the encryption of the mail data set from each of a plurality of prestored senders and automatically encrypts the mail data set from the senders for whom the encryption is designated.

In a first aspect of the invention, there is provided a data receiving apparatus comprising: receiving means for receiving mail data set; storing means for storing the mail data set received by the receiving means; and display means for displaying the mail data set stored in the storing means, the data receiving apparatus further comprising: designating means for designating one or more senders in advance whose mail data is desired to be made secret; and display control means for causing the display means not to display the mail data set coming from the sender(s) designated by the designating means but to display only the mail data set from senders other than the sender(s) designated by the designating means.

According to the first aspect, if the secret setting is made for a sender, the display of the mail data set from the sender for whom the secrete setting is made can be automatically interrupted. As a result, the mail data set from the sender can be prevented from being directly confirmed by other persons and they can be prevented from being carelessly accessed to by others.

In a second aspect of the invention, the data receiving apparatus of the first aspect further comprises personal data storing means for storing personal data sets on one or more persons for identifying the person(s), wherein the designating means determines whether or not the mail data set from the person designated by the personal data set is to be made secret.

According to the second aspect, the designating means of the data receiving apparatus operates as described above. The personal data set is exemplified by so-called "address data" or so-called "telephone directory data". As a result, it is possible to determine in addition to the data, which is stored in advance in the data receiving apparatus, such as the address data or the telephone directory data, whether or not the mail data set from the person specified by the data set are to be kept secret, so that the complicated operations can be eliminated. Moreover, the storage capacity of the personal data storing means can be effectively utilized.

In a third aspect of the invention, the data receiving apparatus of the second aspect further comprises:

sender decision means for deciding whether or not the sender of the mail data set received by the receiving means is one of the sender identified by the personal data set stored in the personal data storing means and the one of the senders who is designated by the designating means; and flag adding means for adding a display flag to the mail data set, as responding to the decision result of the sender decision means, wherein the display flag takes a first value, when the sender of the mail data set is one of the identified sender and the designated sender, and takes a second value when the sender of the mail data set is not any of those who are individually identified by all the personal data sets or when the sender of the mail data set is not the specified sender, and wherein the display control means reads only the mail data set to which the display flag of the second value is added, from the storing means and feeds the mail data set to the display means.

According to the third aspect, the data receiving apparatus can determine whether or not the mail data set is to be kept secret, in accordance with the sender of the mail data set when the receiving means receives the mail data set. This simplifies the operations of the display control means when the mail data set stored in the storing means are to be displayed.

In a fourth aspect of the invention, the data receiving apparatus of the first aspect further comprises:

password storing means for storing a predetermined password;

password input means for inputting the password; and password comparing means for comparing the password inputted by the password input means and the password stored in the password storing means, wherein the display control means responds to the comparison result of the password comparing means and cause the display means to display only mail data sets from the other senders when the two password are not coincident, and cause the display means to display all data of the mail data set when the two password are coincident.

According to the fourth aspect, depending upon whether or not the user has inputted the correct password to the password input means, the data receiving apparatus decides whether or not the mail data set from the sender designated by the designating means is to be displayed.

In a fifth aspect of the invention, in the data receiving apparatus of the first aspect, the display control means causes the display means to display a number of all the mail data sets stored in the storing means.

According to the fifth aspect, the display control means of the data receiving apparatus further performs the above-mentioned operation. This allows the user to know the number of all the mail data sets stored by the storing means. Therefore, the user can know whether or not all the mail data sets stored in the storing means is displayed.

In a sixth aspect of the invention, there is provided a data receiving apparatus comprising: receiving means for receiving a mail data set; storing means for storing the mail data set received by the receiving means; and display means for displaying the mail data set stored in the storing means, the data receiving apparatus further comprising: designating means for designating one or more senders in advance in order that the mail data sets from the senders is made secret; and display control means for encrypting the mail data set from the sender designated by the designating means, and causing the display means to display the mail data set.

According to the sixth aspect, the data receiving apparatus comprises: the designating means for designating one of more senders in advance in order that the mail data sets from the senders is made secret; and the display control means for encrypting the mail data set from the sender designated by the designating means, and causing the display means to display the mail data set. As a result, the data receiving apparatus designates the encryption of the mail data set from each of designated senders so that the mail from the sender for whom the encryption is designated can be automatically encrypted. This makes it possible that the mail to be kept secret from others is unreadable even if attempted to by others.

In a seventh aspect of the invention, the data receiving apparatus of the sixth aspect further comprises personal data storing means for storing identification personal data sets on one or more persons, wherein the designating means determines whether or not the mail data sets from persons identified by the personal data sets are to be made secret according to the personal data.

According to the seventh aspect, the data receiving apparatus is given the aforementioned construction. For the same reasons as those of the second aspect, therefore, the troubles of the operations for designating the senders are eliminated. As a result, the storage capacity of the personal data storing means can be effectively exploited.

In an eighth aspect of the invention, in the data receiving apparatus of the sixth aspect, the display control means inverts values of all of bits which compose the mail data set from the sender designated by the designating means and feeds inverted values to the display means.

According to the eighth aspect, the display control means of the data receiving apparatus operates as described above. When the data composed of the inverted bits are displayed on the display means, they are a series of nonsense characters. As a result, the data receiving apparatus can easily display the mail data set from the designated sender, in a manner unknown to others.

BRIEF DESCRIPTION OF THE DRAWINGS

Other and further objects, features, and advantages of the invention will be more explicit from the following detailed description taken with reference to the drawings wherein:

FIG. 1 is a view showing an input screen for a user to input personal data while an electronic mail receiving terminal according to a first embodiment is executing the so-called "telephone directory function";

FIG. 2 is a diagram showing a sender table in the electronic mail receiving terminal for storing the personal data;

FIG. 3 is a diagram showing a list of the received mail which are displayed on the electronic mail receiving terminal when a predetermined password is correctly inputted;

FIG. 4 is a diagram showing a list of received mail which are displayed on the electronic mail receiving terminal when the password is erroneously inputted or not inputted;

FIG. 5 is a block diagram showing such a first one of all the constructions of the electronic mail receiving terminal as concerned with a mail reception;

FIG. 9 is a diagram showing an input screen for a user to input personal data while the electronic mail receiving terminal according to a second embodiment is executing the so-called "telephone directory function";

FIG. 10 is a diagram showing a sender table in the electronic mail receiving terminal for storing the personal data;

FIG. 11 is a diagram showing a list of received mails which are displayed on the electronic mail receiving terminal when a predetermined password is correctly inputted;

FIG. 12 is a diagram showing a list of received mail which are displayed on the electronic mail receiving terminal when the password is erroneously inputted or not inputted;

DETAILED DESCRIPTION OF THE PREFERRED EMBODIMENTS

Figure 6:
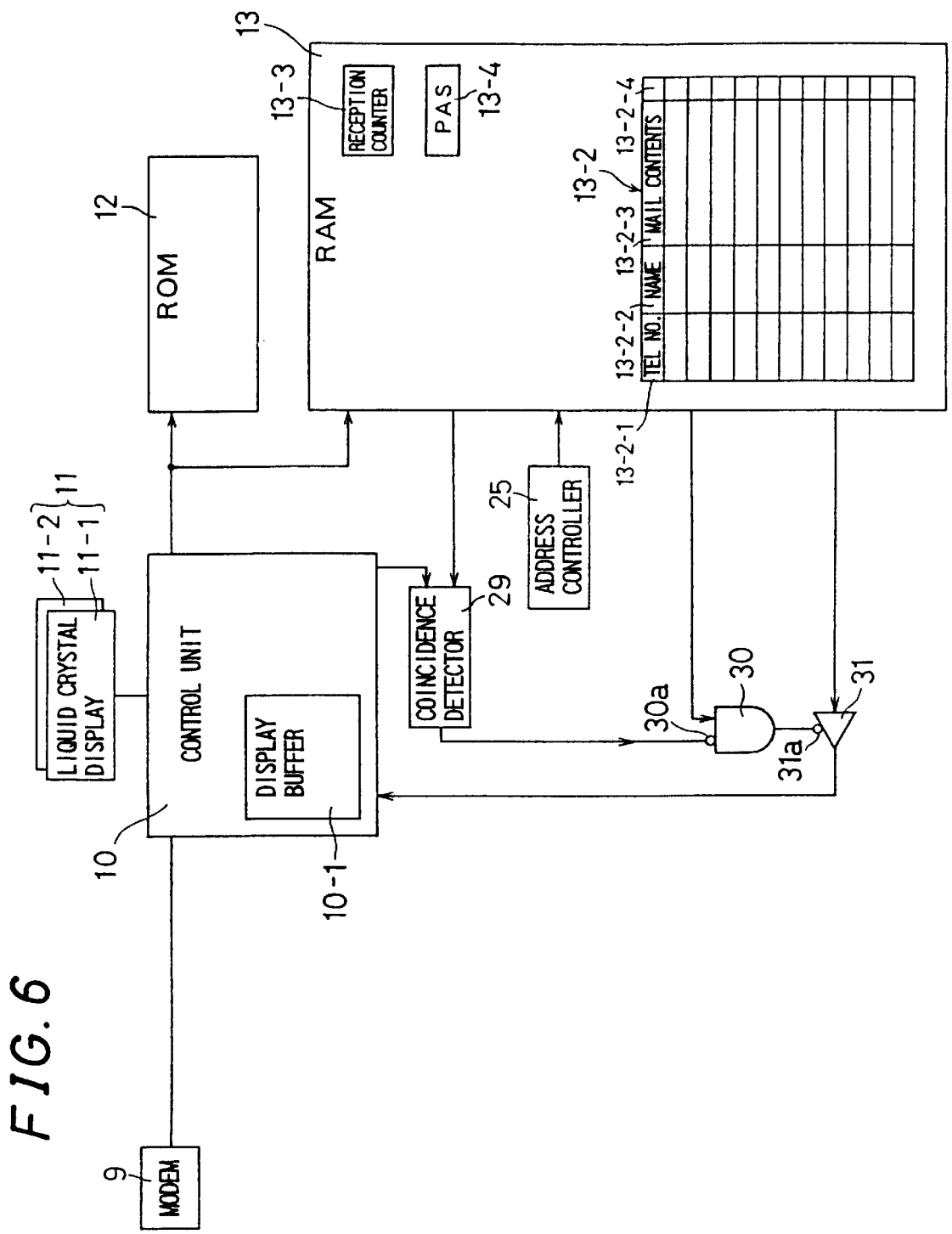
FIG. 6 is a block diagram showing such a second one of all the constructions of the electronic mail receiving terminal as concerned with a display of the list of received mails.

Now referring to the drawings, preferred embodiments of the invention are described below.

Here will be described an electronic mail receiving terminal according to a first embodiment of the invention. It is assumed that the electronic mail receiving terminal is combined with a server to construct a so-called "mail system" so that it may exchange mail data wirelessly with the server. In short, the electronic mail receiving terminal is realized by a portable telephone terminal having the so-called "mail receiving function". The electronic mail receiving terminal has the so-called "telephone directory function" in addition to the mail receiving function. The telephone directory function is to store personal data such as telephone numbers or names in advance and to allow the user to peruse the personal data.

Here will be schematically described the operations of the electronic mail receiving terminal. This electronic mail receiving terminal is equipped with a display having an input function for the user of the electronic mail receiving terminal to input the personal data. This display is exemplified by a liquid crystal display and a transparent tablet overlaid on the liquid crystal display. In the following description it is assumed that a button, as displayed on the liquid crystal display, is depressed when the user touches the portion in the transparent tablet just over the button with his or her finger or pen.

In order to input the personal data with the telephone directory function, the user first sets the operation mode of the electronic mail receiving terminal into the telephone directory input mode, and depresses a new input button. When this new input button is depressed, a new input screen is displayed, as shown in FIG. 1.

FIG. 1 is a diagram showing an example of display of a display screen when personal data is to be inputted for executing the telephone directory function.

Here, the user first inputs his or her name, telephone number, facsimile number, mail address and residence as the personal data and then touches a secret button 1 to designate whether or not the personal data is to be made secret. The mail data sent from a person identified with the personal data with secret setting to the user of the electronic mail receiving terminal, are kept secret from a third person.

Specifically, the display of the secret button 1 is inverted, when the user once touches it, so that the personal data being inputted are kept secret. When the secret setting is cancelled, the display of the inverted button is returned to the original state, when the user touches it, so that the secret setting is cancelled. When the input of the personal data is to be canceled midway, a quit button 2 is depressed.

When the user completes the inputting of the personal data and touches a register button 3, the inputted personal data is stored together with a secret flag in a sender table, as shown in FIG. 2. This sender table is disposed in a later-described RAM of the electronic mail receiving terminal. The secret flag indicates whether or not the personal data are to be kept secret. In other words, the portion in the sender table for storing the secret flag corresponds to designating means for designating a sender whose mail data is to be made secret. The sender table stores a telephone number 4, a name 5 and a secret flag 6 etc. in a table format, as shown in FIG. 2. From FIG. 2, there are omitted the facsimile number, the mail address and the residence, which are also so stored as a matter of fact in the sender table as to correspond to the secret flag 6.

The secret flag 6 of the personal data for which the secret button 1 is inverted at the inputting time, that is, the personal data kept secret, is set to "1", and the secret flag 6 of the personal data for which the secret button 1 is not inverted at the inputting time, that is, the personal data kept open, is set to "0".

When the user confirms the mail data set received by the electronic mail receiving terminal, the operation mode of the electronic mail receiving terminal is changed to a mail transmit/receive mode. When the user selects a password input mode in the mail transmit/receive mode, the display screen of the display turns to a password input screen. When the user inputs an accurate password, indication of the number of received mails 7 is displayed at first, in an example of the display screen of FIG. 3, and a received mail list 8 for all received mails is displayed on the display, independently of the contents of the secret flag.

When the user inputs no password or an erroneous password to the password input screen, on the other hand, the received mail list 8 only for mails from persons identified by the personal data having no secret flag "1", is displayed as shown in the display screen example of FIG. 4. The indication of the number of received mails 7 at this time shows the number of all mails that also include the mails from the persons identified by the personal data having the secret flag "1" in fact.

The foregoing operations will be specifically described with reference to the block diagrams of FIGS. 5 and 6. The following description exemplifies a device such as a portable telephone for transmitting and receiving data wirelessly.

FIG. 5 is a block diagram showing only such a first one of all the constructions of the electronic mail receiving terminal, as concerned with the operations at the mail receiving time. The first construction includes a modem 9, a control unit 10, a display 11, a ROM 12, a RAM 13, a shift register 14, AND circuits 15 and 27, gate circuits 16 and 17, a clock circuit 18, an OR circuit 19, NOT circuits 47a and 19a, an end code detector 20, a delimiter code detector 21, flip-flops (as will be abbreviated as "FF") 22, 23 and 28, a buffer 24, an address controller 25 and a coincidence detector 26.

The modem 9 exchanges the mail data set wirelessly with the server. The control unit 10 controls the data to be inputted/outputted to the electronic mail receiving terminal, by using various instructions.

The display 11 exchanges a liquid crystal display 11-2 of matrix type made thin and capable of displaying characters, and a transparent tablet 11-1 sized to cover the liquid crystal display 11-2. This allows the user to input data to the electronic mail receiving terminal with his or her pen or finger.

The transparent tablet 11-1 is provided, for example, with transparent electrodes on the inner surfaces of two transparent sheets and is so regularly printed with small projection spacers on the surfaces that the individual electrodes may not come into contact in an ordinary state. Contacts are made at the transparent electrodes when the user touches one point in the sheet with his or her finger or pen. The control unit 10 is enabled to locate a selected position in the transparent tablet 11-1 by examining the position at which the contacts are made at the transparent electrodes. Moreover, the control unit 10 is enabled to locate the position of the liquid crystal display 11-2 selected by the user, by taking a positional relation between the selected position in the transparent tablet 11-1 and the contents displayed on the liquid crystal display 11-2. Here, the liquid crystal display 11-2 may be equipped, if necessary, with a back light of an EL panel or the like on its back face.

The ROM 12 stores a program instructing the operations of the control unit 10, a calendar data program for counting the date, fonts for characters to be displayed on the liquid crystal display 11-2, and transformation data for transforming the coordinates detected by the control unit 10 into those corresponding to the display position.

The RAM 13 stores various data such as text or graphics inputted through the display 11 by the user, and is equipped with a sender table 13-1 for identifying the sender, a received mail storage 13-2, a reception counter 13-3 and a password storage 13-4.

Here, the sender table 13-1 can store a telephone number 13-1-1, a name 13-1-2 and a secret flag or an encryption flag 13-1-3 for personal data on each person. The received mail storage 13-2 can store a telephone number 13-2-1, a name 13-2-2, mail contents 13-2-3 and a flag 13-2-4 for the mail data set from each sender.

The mail data received by the modem 9 is outputted to the control unit 10, fed from the control unit 10, and latched by the shift transistor 14. Here, the received mail data set is composed of a sender code, a delimiter code, a text and an end code. When the reception of the mail data set is ended, a signal having the value "1" is outputted from the control unit 10 to the AND circuit 15.

The end code detector 20 outputs a signal having the value "0" while it is not detecting the end code, as described hereinafter. Since no end code is detected by the end code detector 20 before the data are received, the signal outputted from the end code detector 20, takes the value "0". This signal is inverted by the NOT circuit 19a and fed to the OR circuit 19. From the instant when the reception of the mail data set is ended, therefore, the signal at "1" is outputted from the OR circuit 19 to the AND circuit 15.

To the AND circuit 15, there are inputted the signals of the control unit 10, the clock circuit 18 and the OR circuit 19. The clock circuit 18 outputs either the signal at "1" or the signal at "0" for a predetermined period. Since the signal "1" is outputted not only from the control unit 10 but also from the OR circuit 19 from the instant when the reception of the mail data set is ended to the instant when the end code detector 20 detects the end code, the output of the clock circuit 18 is unchanged to become the output of the AND circuit 15.

In each reception of the signal from the AND circuit 15, the shift register 14 outputs one code in the mail data set to the gates 16 and 17, the end code detector 20 and the delimiter code detector 21. The one code outputted from the shift register 14, is inputted again to the shift register 14. As a result, the shift register 14 stores the end code of the mail data set and then the portion other than this end code. The delimiter code detector 21 outputs the signal "0" till it detects a delimiter code.

The FF 23 is left reset while it is fed with the signal having the value "0" from the delimiter code detector 21. This reset FF 23 outputs the signal at the value "0". The output of the reset FF 23 is inverted by a NOT circuit 17a and fed to the control terminal of the gate 17 to open the gate 17. When the gate 17 is thus opened, the codes to be outputted from the shift register 14 are sequentially stored in the buffer 24. These operations are repeated till the delimiter code is outputted from the shift register 14.

When the delimiter code is outputted from the shift register 14, the delimiter code detector 21 outputs the signal "1" to set the FF 23. This signal "1" thus outputted from the set FF 23 is inverted and inputted to the control terminal of the gate 17 to close the gate 17. By these operations, the buffer 24 is stored with only the sender code in the mail data set. In short, the shift register 14, the AND circuit 15, the gate circuit 17, the NOT circuit 17a, the clock circuit 18, the OR circuit 19, the delimiter code detector 21, the FF 23 and the buffer 24 construct the sender code extractor for extracting the sender code from the mail data set.

When the FF 23 is set, the signal "1" is outputted from the FF 23 to the coincidence detector 26 to activate the coincidence detector 26.

The signal "1" from the FF 23 is also outputted to the address controller 25. In response to this signal, the address controller 25 changes the address in the sender table 13-1 of the RAM 13 designated by the address controller 25, into that of a leading one of all the personal data sets on persons. Next, the address controller 25, as sequentially designating the addresses of the personal data in the sender table 13-1, designates the address of the final personal data of the sender table 13-1 and then outputs the signal "1" to the OR circuit 19.

The sender code stored in the buffer 24, is outputted to the coincidence detector 26, in which it is compared with the telephone number 13-1-1 of the personal data in the sender table 13-1 of the RAM 13, as designated by the address controller 25. When the sender code stored in the buffer 24 and the telephone number 13-1-1 in the sender table 13-1, as designated by the address controller 25, are coincident, the signal "1" is outputted from the coincidence detector 26 to the AND circuit 27.

To the AND circuit 27, there are simultaneously inputted the signal from the coincidence detector 26 and the value of the secret flag 13-1-3 of the personal data set designated by the address controller, in the sender table 13-1 of the RAM 13. When the signal from the coincidence detector 26 has the value "1" and when the secret flag 13-1-3 has the value "1", the AND circuit 27 output the signal "1". In other words, when the signal from the AND circuit 27 takes the value "1", the sender of the mail data set is one who is identified by one of the personal data sets stored in the sender table and whose mail data should be kept secret. When the signal from the AND circuit 27 takes t the value "0", the sender of the mail data set is one who is not identified by all the personal data sets or whose mail data need not be kept secret. In short, the coincidence detector 26 and the AND circuit 27 construct a sender decider for deciding whether or not the sender of the mail data set is identified by one of the personal data sets and whether the mail data set is to be kept secret.

On the other hand, the end code detector 20 outputs the signal "0" while it detects the end code, and outputs the signal "1" to the FF 22 when it detects the end code. The FF 22 is left reset untill it is fed with the signal "0" from the end code detector 20. The FF 22 outputs the signal "0" when it is reset.

The FF 22 is set when it is fed with the signal "1" from the end code detector 20. The FF 22 thus set outputs the signal "1" to the control terminal of the gate 16 to open the gate 16. When this gate 16 is opened, the mail data set latched in the shift register 14, that is, the portion of the mail data set which has been once outputted from the shift register 14 and stored again in the shift register 14, is stored in the received mail storage 13-2 of the RAM 13. Moreover, the signal outputted from the FF 28, is stored in the received mail storage 13-2 as the value of the flag 13-2-4 corresponding to the mail data set. Simultaneously with this, the reception counter 13-3 of the RAM 13 is counted up.

Specifically, the flag 13-2-4 of the received mail storage 13-2 stores the value "1", when the sender code is present in the sender table and when the mail data set from the sender designated by the sender code, is set to be kept secret, but the flag 13-2-4 stores the value "0" when the sender code is absent from the sender table or when the mail data set from the sender designated by the sender code, need not be kept secret. Thus, the description of the first construction is finished.

FIG. 6 is a block diagram showing only such a second one of all the constructions of the electronic mail receiving terminal as concerned with the list of received mails. In the second construction, the parts common to those of the first construction will be designated by the common reference numerals, and their description will be omitted. This second construction includes the control unit 10, the display 11, the ROM 12, the RAM 13, the address controller 25, a coincidence detector 29, an AND circuit 30, a gate circuit 31, and NOT circuits 30a and 31a.

First of all, the value inputted to the display 11 with the password input screen being displayed, is fed to the coincidence detector 29 by the control unit 10. To this coincidence detector 29, there is additionally fed the password which is stored in advance in the password storage 13-4 of the RAM 13.

The coincidence detector 29 compares the inputted value and the password stored in the password storage 13-4, and outputs the signal "1" when the two are coincident with each other, but outputs the signal "0" otherwise.

On the other hand, the address controller 25 designates any of all the mail data sets which are stored in the received mail storage 13-2. The flag 13-2-4 corresponding to the designated mail data set is fed to the AND circuit 30.

The signal outputted from the coincidence detector 29, is inverted by the NOT circuit 30a and inputted to the AND circuit 30, in which it is AND-operated with the flag 13-2-4.

As a result, when the password is not inputted or erroneously inputted, the signal "0" outputted from the coincidence detector 29, is inverted and inputted to the AND circuit 30. The output of the AND circuit 30 at this time is determined according to the value of the flag 13-2-4.

In the above-described case, when the flag 13-2-4 corresponding to the mail data set instructed by the address controller 25, is at the value "0", for example, the output of the AND circuit 30 takes the value "0", and this output "0" is inverted by the NOT circuit 31a and inputted to the control terminal of the gate 31 to open this gate 31.

To the gate 31, there are inputted mail data set indicated by the address controller 25, that is, the telephone number 13-2-1, the name 13-2-2 and the mail contents 13-2-3 from the received mail storage 13-2 of the RAM 13. When the gate 31 is opened, the mail data set indicated at present by the address controller 25, are stored in the display buffer 10-1 of the control unit 10.

Furthermore, in the above-described case, when the flag 13-2-4 corresponding to the mail data set instructed by the address controller 25, is at the value "1", for example, the output of the AND circuit 30 takes the value "1", and this output "0" is inverted and inputted to the gate 31 to close this gate 31. As a result, the mail data set is not fed to the display buffer 10-1.

Furthermore, when the correct password is inputted, on the other hand, the signal "1" outputted from the coincidence detector 29, is inverted and inputted to the AND circuit 30. The output of the AND circuit 30 in this case takes the value "0" independently of the value of the flag 13-2-4 and is inverted and inputted to the control terminal of the gate 31 so that the gate 31 is opened at all times. As a result, the mail data set is fed to the display buffer 10-1.

In any of these three cases, the value of the counter 13-3 of the RAM 13 is outputted to the display buffer 10-1. At the instant when the address controller 25 indicates all the mail data sets in the received mail storage 13-2, the control unit 10 causes the display 11 to display the contents of the display buffer 10-1. In short, the control unit 10, the AND circuit 30, the gate circuit 31 and the NOT circuits 30a and 31a construct display control means for causing the display 11 to selectively display all the mail data sets stored in the received data storage 13-2.

The processing routine thus far described will be detailed with reference to the flow charts of FIGS. 7 and 8.

Figure 7:
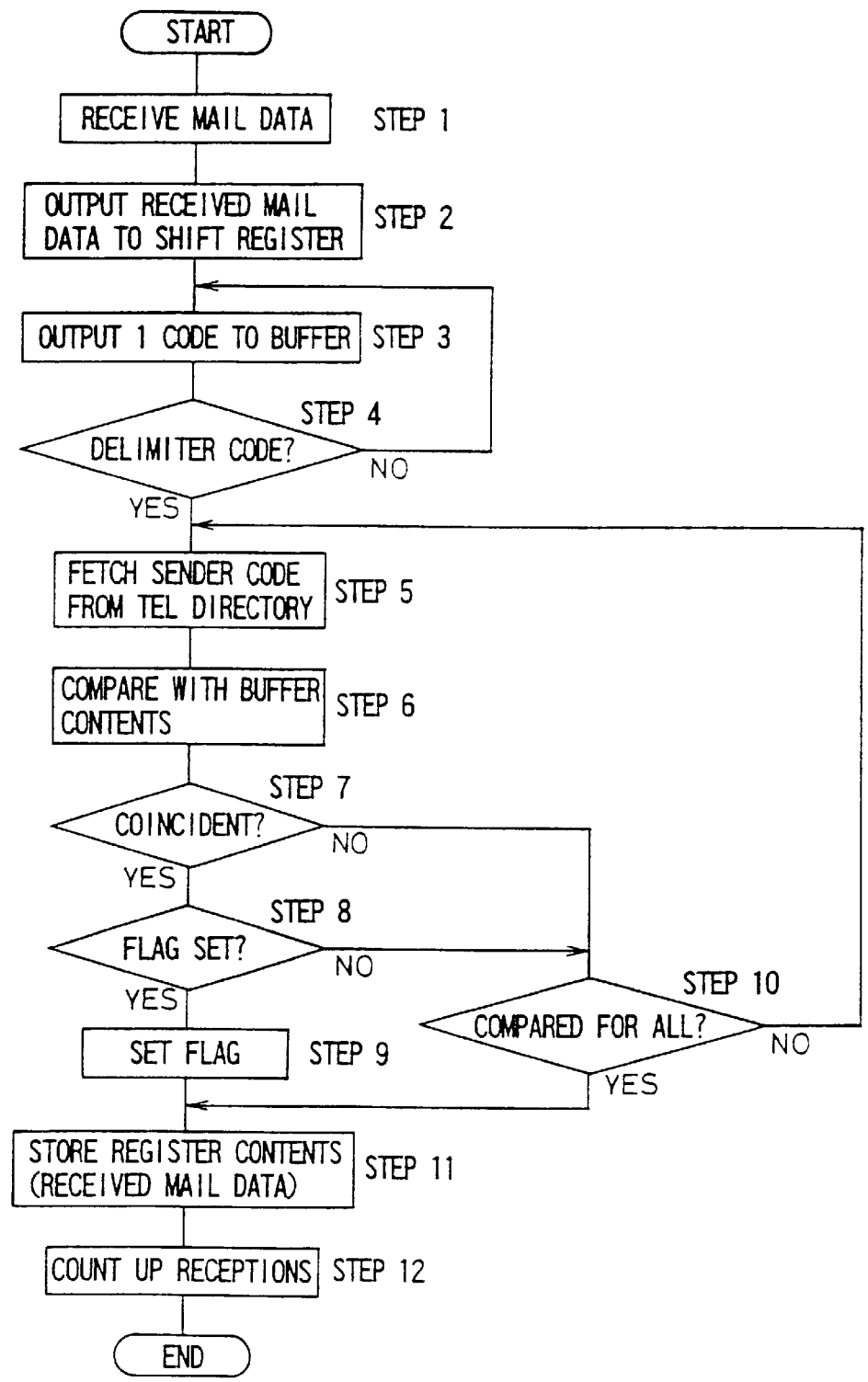
FIG. 7 is a flow chart showing a processing routine of the electronic mail receiving terminal at a mail receiving time.

FIG. 7 is a flow chart showing the processing routine of the electronic mail receiving terminal at the mail receiving time.

First of all, the modem 9 receives the mail data set from the server at step 1, and the received mail data set is latched in the shift register 14 at step 2. At step 3, one code in the mail data set is outputted to the buffer 24 from the shift register 14 latching the mail data set. At step 4, it is decided whether or not the code outputted from the shift register 14 to the buffer 24, is a delimiter code. The operations of step 3 and step 4 are repeated till the delimiter code is outputted to the buffer 24. As a result, the sender code (or the telephone number) in the mail data set is latched in the buffer 24.

When the code outputted from the shift register 14 to the buffer 24 is the delimiter code, the routine advances from step 4 to step 5, at which any of all the sender codes stored in the sender table 13-1, i.e., any telephone number 13-1-1 is fetched from the sender table 13-1 of the RAM 13. At step 6, the received sender code is compared with the latched contents of the buffer 24, i.e., any sender code.

At step 7, it is decided on the basis of the comparison result of step 6 whether or not the contents of the buffer 24 and any sender code are identical to each other. When it is decided at step 7 that the contents of the buffer 24 and any sender code (i.e., the telephone number) 13-1-1 of the sender table 13-1 are not coincident with each other, the routine advances to step 10. When it is decided that the contents of the buffer 24 and any sender code (i.e., the telephone number) 13-1-1 of the sender table 13-1 are coincident with each other, it is decided at step 8 whether or not the secret flag 13-1-3 of the mail data set containing any sender code is set to the value "1".

When the secret flag 13-1-3 of the coincident data of the sender table is at the value "0", the routine advances to step 10. When the secret flag 13-3-1 is at the value "1", at step 9, the flag 13-2-4 corresponding to the mail data set in the received mail storage 13-2 is set to the value "1".

When the content of the buffer 24 and the sender code 13-1-1 of the sender table 13-1 are not coincident, or when that content and the sender code are coincident and when the secret flag 13-1-3 corresponding to the mail data set containing the coincident sender code is at the value "0", it is decided at step 10 whether or not the comparisons of step 7 and step 8 have been made for all the data of the sender table 13-1.

When the comparisons of step 7 and step 8 are not made for all the data of the sender table 13-1, the routine is returned to step 5, at which any of the sender codes is changed to execute the operations of step 5 to step 10. In other words, the operations of step 5 to step 10 are repeated till all the data of the sender table 13-1 are compared.

When the flag is set at step 9 or when all the data of the sender table 13-1 are compared at step 7 and step 8, the contents (i.e., the received mail data set) of the shift register 14 are stored at step 11 in the received mail storage 13-2 of the RAM 13. At step 12, the number of received mails (i.e., the counter 13-3 of the RAM 13) is counted up. Thus, the operations at the mail receiving time are ended.

Figure 8:
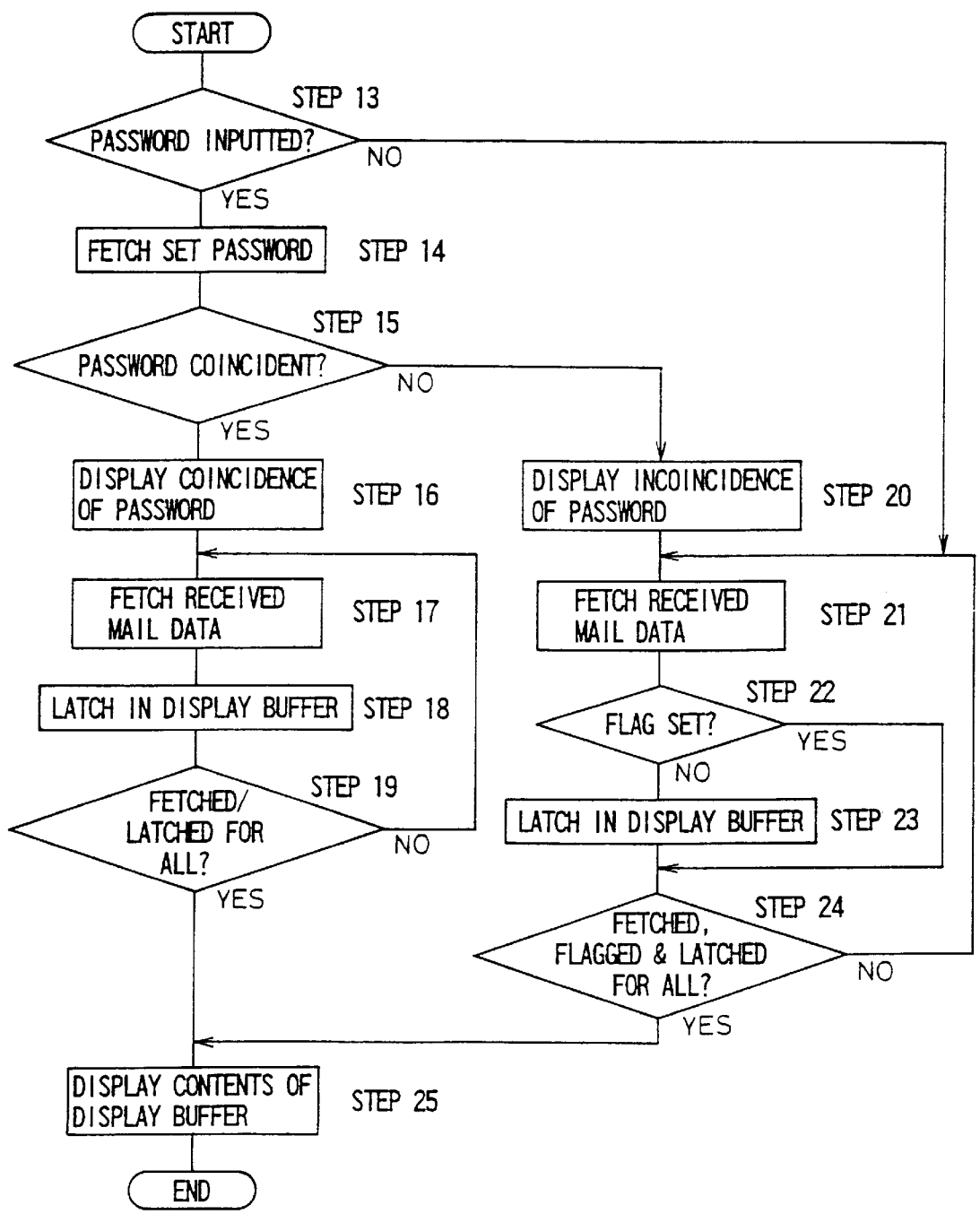
FIG. 8 is a flow chart showing a processing routine of displaying the list of received mails by the electronic mail receiving terminal.

FIG. 8 is a flow chart showing the displaying operations of the received mail list of the electronic mail receiving terminal.

First of all, it is decided at step 13 whether or not the password is inputted to the password input screen by the user. The routine advances to step 21 when the password is not inputted. When the password is inputted, the password set in the password storage 13-4 of the RAM 13, is fetched at step 14.

At step 15, the password fetched at step 14 is compared with the inputted one, and the routine advances to step 20 when they are not coincident. When the password fetched at step 14 and the inputted password are coincident, the coincidence of the passwords are displayed on the display 11 at step 16.

At next step 17, any of all the mail data sets stored in the received mail storage 13-2, that is, the single sender code (or telephone number) 13-2-1, the name 13-2-2 and the mail contents 13-2-3 are fetched from the received mail storage 13-2 of the RAM 13, and latched in the display buffer 10-1 at step 18.

At step 19, it is decided whether or not the operations of step 17 and step 18 have been made for all the mail data sets that are stored in the received mail storage 13-2 of the RAM 13. The operations of step 17 to step 19 are repeated while changing any of the mail data set untill the operations are made for all the mail data sets.

When it is decided at step 19 that the operations of step 17 and step 18 have been made for all the mail data sets, the routine advances to step 25.

When the comparison at step 15 reveals that the password fetched at step 14 and the inputted password are not coincident, the display 11 indicates at step 20 that the password is incorrect.

At step 21, any of all the mail data sets, that is, the single sender code (or telephone number) 13-2-1, the name 13-2-2 and the mail contents 13-2-3 are fetched from the received mail storage 13-2 of the RAM 13. It is then decided at step 22 whether or not the flag 13-2-4 corresponding to the fetched mail data set, i.e., the flag 13-2-4 set at step 9 in FIG. 7 is set to the value "1".

When the flag of the fetched mail data set is at "0", the mail data set fetched at step 23, are latched in the display buffer 10-1. At step 24, it is decided whether or not the operations of step 21 to step 23 have been made for all the mail data sets. These operations of step 21 to step 24 are repeated while changing any of the mail data till the operations are made for all the mail data sets.

When it is decided at step 19 or step 24 that the operations of step 17 and step 18 or step 21 to step 23 have been made for all the mail data sets, the contents of the display buffer 10-1 are displayed on the display 11 at step 25. Thus, the description of the display routine of the received mail list is ended.

By the processing routine thus far described, the mail from the sender, which is set as secret on the basis of the secret setting of each sender in the telephone directory, is disabled to be confirmed directly by a third party.

Here will be described an electronic mail receiving terminal according to a second embodiment of the invention. It is assumed that the electronic mail receiving terminal is combined with a server to construct the mail system so that it may exchange a mail data set wirelessly with the server. In short, the electronic mail receiving terminal is realized by a portable telephone terminal having the so-called "mail receiving function". The electronic mail receiving terminal has the so-called "telephone directory function" in addition to the mail receiving function. The parts in the electronic mail receiving terminal of the second embodiment, as common to those in electronic mail receiving terminal of the first embodiment, will be designated by the common reference numerals, and their detailed description will be omitted.

Here will be schematically described the operations of the electronic mail receiving terminal. This electronic mail receiving terminal is equipped with the display 11 having the same construction as that of the electronic mail receiving terminal of the first embodiment so that the user of the electronic mail receiving terminal may input the personal data set.

In order to input the personal data set with the telephone directory function, the user first sets the operation mode of the electronic mail receiving terminal into the telephone directory input mode and depresses a new input button. When this new input button is depressed, a new input screen is displayed, as shown in FIG. 9. FIG. 9 is a diagram showing an example of the input screen for the personal data set in the telephone directory function. Here, the user inputs at first his or her name, telephone number, facsimile number, mail address and residence as the personal data set and then touches an encryption button 32 to designate the encryption of the personal data set. The mail data set sent from a person identified by the personal data set designated for the encryption to the user of the electronic mail receiving terminal, are kept secret.

Specifically, the display of an encryption button 32 is inverted, when this button is once touched, so that the personal data set being inputted are designated for the encryption. When the encryption is to be released, the display of the inverted button is returned to the original state, when it is touched, so that the encryption is released. When the input of the personal data set is to be canceled midway, the quit button 2 is depressed by the user. When the user ends the inputting of the personal data set and touches the register button 3, the personal data set inputted are stored together with an encryption flag in the sender table, as shown in FIG. 10. This sender table is disposed in the RAM 13 of the electronic mail receiving terminal. The encryption flag 33 indicates whether or not the personal data sets are designated for the encryption. The sender table stores the telephone number 4, the name 5 and the encryption flag 33 in the table format, as shown In FIG. 10.

Specifically, the encryption flag 33 of the personal data set for which the encryption button 32 is inverted at the inputting time, that is, the personal data set designated for the encryption is set to "1", and the encryption flag 33 of the personal data set, for which the encryption button 32 is not inverted at the inputting time, that is, the personal data set not designated for the encryption is set to "0".

When the user confirms the mail data set, the operation mode of the electronic mail receiving terminal is changed to a male transmit/receive mode. When the user select the password input mode in the mail ransmit/receive mode, the diplay screen of the display 11 turns to the password input screen. When the user inputs an accurate password, the number of received mails 7 is displayed at first, in an example of the display screen of FIG. 11 independently of the contents of the encryption flag 33, and the received mail list 8 for all received mails is displayed on the display.

When the user inputs no password or an erroneous password to the password input screen, the mail from a person identified by the personal data set having no encryption flag 33 at "1" is displayed as it is, and the mail from a person identified by the personal data set having the encryption flag 33 at "1" is displayed in an encrypted form in the received mail list 8, as shown in the display screen example of FIG. 12. The number of received mails at this time indicates the number of all mails that also include the mails coming from the person identified with the personal data set having the encryption flag 33 at "1" in fact.

The foregoing operations will be specifically described with reference to FIG. 13. Here, the construction, as concerned with the operations at the mail receiving time, of all the constructions of the electronic mail receiving terminal is identical to the first construction of the electronic mail receiving terminal of the first embodiment, as has been described with reference to FIG. 5. The detailed operations of the construction, as concerned with the operations at the mail receiving time, are identical to those of the first construction, as described with reference to FIG. 7, except that the secret flag is replaced by the encryption flag. Therefore, here will be omitted the description of the construction concerned with the operations at the mail receiving time and the detailed operations of the construction.

Figure 13:
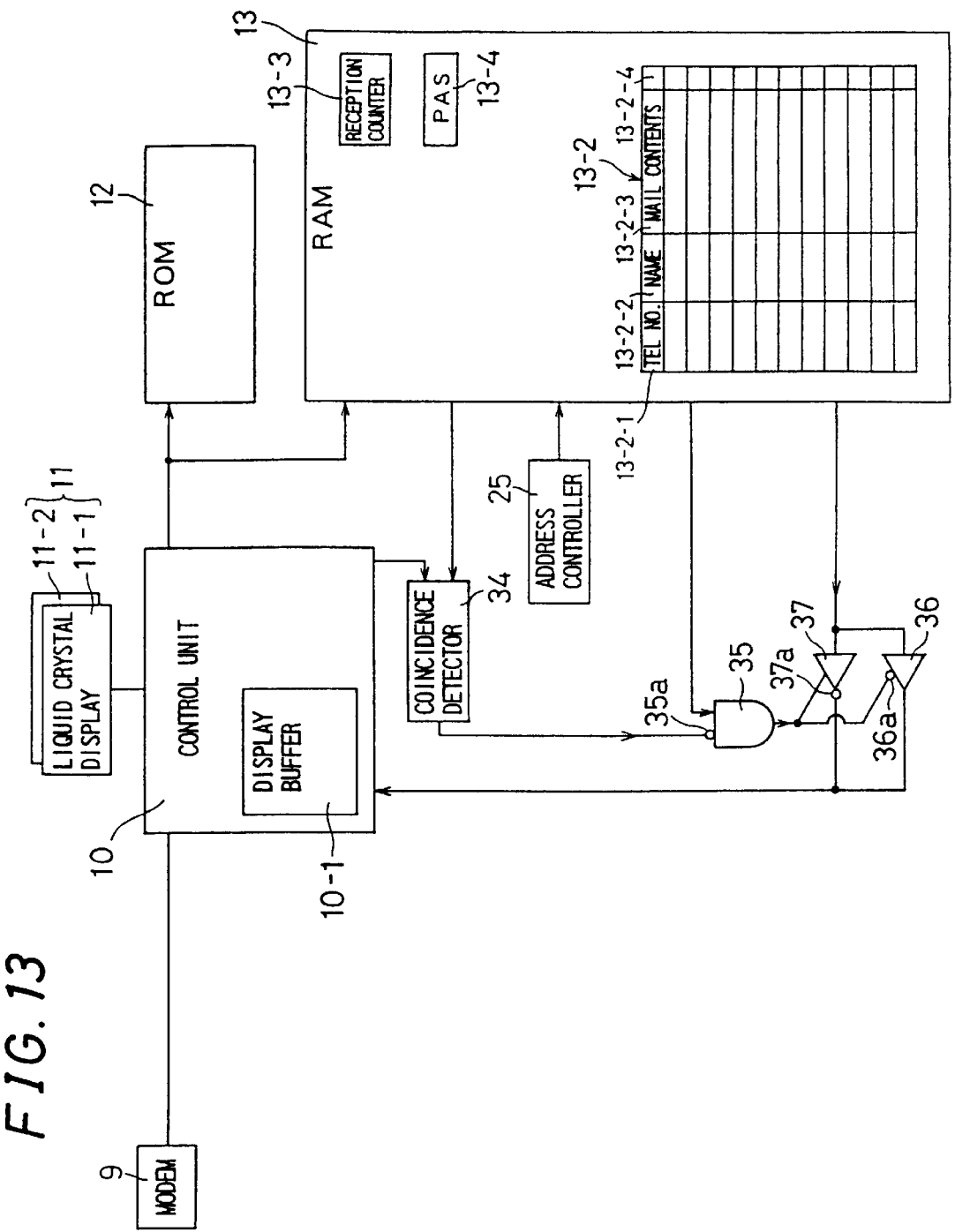
FIG. 13 is a block diagram showing such one of all the constructions of the electronic mail receiving terminal as concerned with a display of the list of received mails.

FIG. 13 is a block diagram showing such one of all the constructions of the electronic mail receiving terminal as is concerned with the display of the received mail list. This construction includes the control unit 10, the display 11, the ROM 12, the RAM 13, the address control unit 25, a coincidence detector 34, an AND circuit 35, gate circuits 36 and 37 and NOT circuits 35a to 37a.

First of all, the control unit 10 outputs the value inputted into the display 11 by the password input screen, to the coincidence detector 34. This coincidence detector 34 is additionally fed with password stored in advance in the password storage 13-4 from the RAM 13.

The coincidence detector 34 detects the coincidence between the value inputted in the password input screen and the contents of the password storage 13-4. The signal "1" is outputted when they are coincident, and the signal "0" is outputted when not coincident.

On the other hand, the address controller 25 designates one of all the mail data sets that are stored in the received mail storage 13-2. The flag 13-2-4 corresponding to the designated mail data set is fed to the AND circuit 30.

The signal outputted from the coincidence detector 34, is inverted by the NOT circuit 35a and is inputted to the AND circuit 35 so that it is AND-operated with the flag 13-2-4 by the AND circuit 35.

As a result, when the password is not inputted or erroneously inputted, the signal "0" outputted from the coincidence detector 34, is inverted and fed to the AND circuit 35. The output of the AND circuit 35 at this time is determined by the value of the flag 13-2-4.

To the gates 36 and 37, the mail data set which is designated by the address controller 25, that is, the telephone number 13-2-1, the name 13-2-2 and the mail contents 13-2-3 are input from the received mail storage 13-2 of the RAM 13.

When the flag 13-2-4 is at the value "0" in that case, the output of the AND circuit 35 takes the value "0" and is inverted by the NOT circuit 36a and fed to the control terminal of the gate 36, so that the gate 36 is opened. At this time, moreover, the gate 37 is closed. When the gate 36 is opened, the mail data set designated at present by the address controller 25, is stored as they are through the gate 36 in the display buffer 10-1 of the control unit 10.

When the flag 13-2-4 is at the value "1" in that case, on the other hand, the output of the AND circuit 35 takes the value "1" and is inverted by the NOT circuit 36a and fed to the control terminal of the gate 36, so that the gate 36 is closed. At this time, the output of the AND circuit 35, i.e., the value "1" of the flag 13-2-4 is fed as it is to the control terminal of the gate 37 to open the gate 37. In the gate 37, the code inputted from the received mail storage 13-2 of the RAM 13, that is, the code constructing the mail data set designated by the address controller 25, passes through the gate 37 and is inverted by the NOT circuit 37a so that it is stored in the display buffer 10-1. As a result, the mail data set is encrypted.

When the accurate password is inputted, the signal "1" outputted from the coincidence detector 34, is inverted and inputted to the AND circuit 35. The output of the AND circuit 35 in this case takes the value "0" independently of the value of the flag 13-2-4 and is inverted and inputted to the gate 36 to open the gate 36. At this time, the output of the AND circuit 35 is fed as it is to the gate 37 so that the gate 37 is closed at all times. As a result, the mail data set is always stored as they are through the gate 36 in the display buffer 10-1.

In any of these three cases, the value of the counter 13-3 of the RAM 13 is outputted to the display buffer 10-1. At the instant when the address controller 25 indicates all the mail data sets in the received mail storage 13-2, the contents of the display buffer 10-1 are displayed on the display 11. In short, the control unit 10, the AND circuit 35, the gate circuits 36 and 37 and the NOT circuits 35a to 37a construct display control means for selectively encrypting all the mail data sets stored in the received data storage 13-2 and causing the display 11 to display the mail data set.

Figure 14:
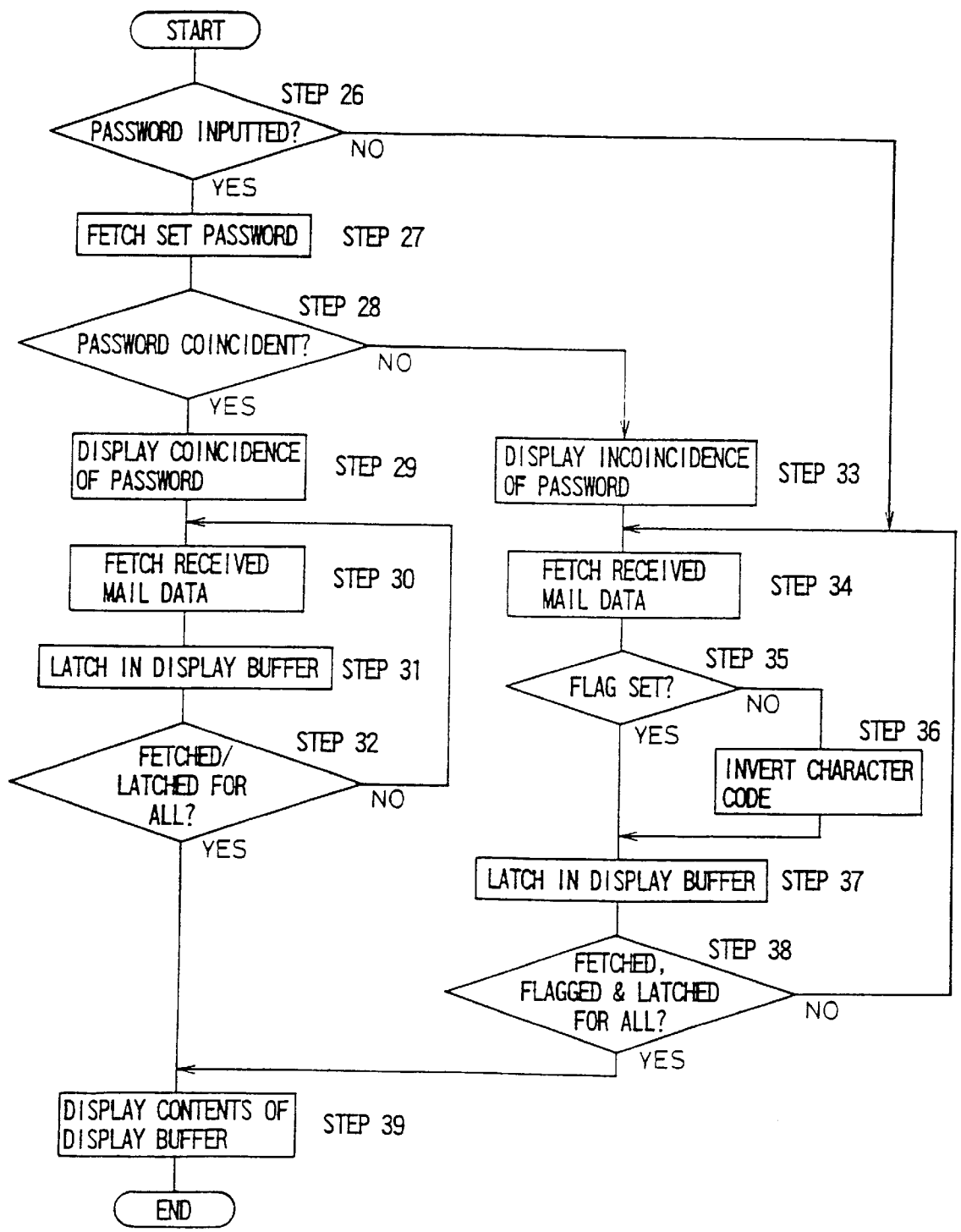
FIG. 14 is a flow chart showing a process routine of displaying the list of received mails by the electronic mail receiving terminal.

The processing routine thus far described will be detailed with reference to the flow chart of FIG. 14. FIG. 14 is the flow chart showing the processing routine of the electronic mail receiving terminal at the mail receiving time.

First of all, it is decided at step 26 whether or not the user has inputted the password to the password input screen. The routine advances to step 34, when the password has not been inputted. When the password has been inputted, the password set in the password storage 13-4 of the RAM 13 is fetched at step 27.

At step 28, the password fetched at step 27 and the inputted password are compared, and the routine advances to step 33 when they are not coincident. When the password fetched at step 27 and the inputted password are coincident, on the other hand, the coincidence of the passwords is displayed on the display 11 at step 29.

At next step 30, any of all the mail data sets that are stored in the received mail storage 13-2, that is, the single sender code (or telephone number) 13-2-1, the name 13-2-2 and the mail contents 13-2-3 are fetched from the received mail storage 13-2 of the RAM 13, and latched in the display buffer 10-1 at step 31.

At step 32, it is decided whether or not the operations of step 30 and step 31 have been made for all the mail data sets that are stored in the received mail storage 13-2 of the RAM 13. The operations of step 30 to step 32 are repeated while changing any of the mail data sets untill the operations are made for all the mail data sets. When it is decided at step 32 that the operations of step 30 and step 31 have been made for all the mail data sets, the routine advances to step 39.

When the comparison of step 28 reveals that the password fetched at step 27 and the inputted password are not coincident, the display 11 indicates at step 33 that the password is incorrect.

At step 34, any of all the stored data, that is, the single sender code (or telephone number) 13-2-1, the name 13-2-2 and the mail contents 13-2-3 are fetched from the received mail storage 13-2 of the RAM 13. It is then decided at step 34 whether or not the encryption flag 33 corresponding to the telephone number in the sender table which is coincident to the sender code of the mail data set fetched at step 34, is set at the value "1".

When the encryption flag 33 of the received mail data set fetched is set at the value "1", all the character codes constructing the fetched mail data set are inverted at step 36. When the encryption flag 33 of the fetched mail data set is reset to the value "0", the routine advances from step 35 to step 37. At step 35 and step 36, therefore, of all the mail data sets to be store, only the mail data set containing the sender code coincident with the telephone number in the sender table corresponding to the encryption flag 33 set to the value "1" are encrypted, and the remaining mail data sets are held as they are. At step 37, the mail data set, as processed at step 35 and step 36, are latched in the display buffer 10-1.

At step 38, it is decided whether or not the operations of step 34 to step 37 have been made for all the mail data sets that are stored in the received mail storage 13-2 of the RAM 13. The operations of step 34 to step 38 are repeated while changing any of the mail data sets untill the operations are made for all the mail data sets.

When it is decided at step 38 that the operations of step 34 to step 37 have been made for all the mail data sets, the contents of the display buffer 10-1 are displayed on the display 11 at step 39.

Thus, the description of the display routine of the received mail list is ended. By these operations the mails from the sender designated to be encrypted, are automatically encrypted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data receiving apparatus comprising:

a receiver for receiving a mail data set;

memory for storing the mail data set received by the receiver; and a display for displaying the mail data set stored in the memory, the data receiving apparatus further comprising:

a designator for designating at least one sender in advance whose mail data set is desired to be kept secret, said designator being operable to determine whether a sender of a mail data set corresponds to any of said at least one sender, and, if so, designating the mail data set as coming from one of said at least one sender; and a display controller for causing the display not to display the mail data set coming from a sender designated by the designator, and to display only mail data sets from a sender other than the at least one sender designated by the designator.

2. The data receiving apparatus of claim 1, further comprising:

personal data storage for storing a personal data set on at least one person for identifying the at least one person, wherein the designator determines whether or not the mail data set from a person designated by the personal data set is to be made secret.

3. The data receiving apparatus of claim 2, further comprising:

a sender decider for deciding whether or not the sender of the mail data set received by the receiver is one of the senders identified by the personal data set stored in the personal data storage and one of the senders designated by the designator; and a flag adder for adding a display flag to the mail data set in response to a decision result of the sender decider, wherein the display flag has a first value, when the sender of the mail data set is one of the identified sender and is designated, and has a second value when the sender of the mail data set is not any of those who are individually identified by the personal data sets or when the sender of the mail data set is not specified, and wherein the display controller reads only the mail data set for which the display flag has said second value, from the memory, and sends the mail data set to the display.

4. The data receiving apparatus of claim 1, further comprising:

password storage for storing a predetermined password;

password inputter for inputting the password; and password comparator for comparing the password inputted by the password inputter and the password stored in the password storage, wherein the display controller responds to a comparison result of the password comparator and causes the display to display only the mail data set from the other sender when the two password do not match, and causes the display to display all data of the mail data set when the two password do match.

5. The data receiving apparatus of claim 1, wherein the display controller causes the display to display the number of all the mail data sets stored in the memory.

6. A data receiving apparatus comprising:

a receiver for receiving a mail data set; memory for storing the mail data set received by the receiver; and a display for displaying the mail data set stored in the memory, the data receiving apparatus further comprising:

a designator for designating a list of senders in advance for which mail data sets from any sender on the list of senders are to be kept secret, wherein said designator is operable to determine whether a sender of a mail data set corresponds to any sender on said list of senders, and, if so, designating the mail data set as coming from a sender on the list of senders; and a display controller for encrypting the mail data set from a sender designated by the designator, and causing the display to display the mail data set.

7. The data receiving apparatus of claim 6, further comprising:

personal data storage for storing identification personal data set for one or more persons, wherein the designator determines whether or not the mail data sets from persons identified by the personal data sets are to be made secret according to the personal data sets.

8. The data receiving apparatus of claim 6, wherein the display controller inverts values of all bits which comprise the mail data set from the sender designated by the designator and sends the inverted values to the display.

* * * * *